United States Patent [19]

Brown, Jr.

[11] 4,210,189
[45] Jul. 1, 1980

[54] TIRE WITH A FOLDED ANNULAR REINFORCEMENT

[75] Inventor: Jack E. Brown, Jr., Akron, Ohio

[73] Assignee: The Goodyear Tire & Rubber Company, Akron, Ohio

[21] Appl. No.: 953,812

[22] Filed: Oct. 23, 1978

Related U.S. Application Data

[63] Continuation of Ser. No. 782,270, Mar. 28, 1977, abandoned.

[51] Int. Cl.² ................................................ B60C 9/22
[52] U.S. Cl. ........................... 152/361 FP; 152/354 R
[58] Field of Search ..... 152/361 R, 361 FP, 361 DM, 152/354 R

[56] References Cited

U.S. PATENT DOCUMENTS

| | | | |
|---|---|---|---|
| 3,516,468 | 6/1970 | Jones | 152/361 FP |
| 3,693,689 | 9/1972 | Winter | 152/361 FP |
| 3,738,408 | 6/1973 | Rach et al. | 152/361 FP |
| 3,913,652 | 10/1975 | Imamura et al. | 152/361 FP X |
| 3,921,692 | 11/1975 | Oyoun | 152/361 FP |
| 4,029,137 | 6/1977 | Suydam | 152/354 X |

FOREIGN PATENT DOCUMENTS 1453617  8/1966  France ............................... 152/361 FP Primary Examiner—John J. Love
Attorney, Agent, or Firm—Frank Pincelli

[57] ABSTRACT

A pneumatic tire with an annular reinforcement in the area of the tread. The annular reinforcement is formed of a single, wide, cord-reinforced ply which is folded so as to have three folded edges and four superimposed, narrower, interconnected layers or plies of rubberized reinforcement cords.

9 Claims, 5 Drawing Figures

TIRE WITH A FOLDED ANNULAR REINFORCEMENT

This is a continuation of application Ser. No. 782,270 filed Mar. 28, 1977 and now abandoned.

BACKGROUND OF THE INVENTION

The invention is especially suited for annularly reinforcing a radial tire, although it can be utilized with a bias-belted type tire.

Briefly stated, the invention is in an annular tire reinforcement positioned between the tire tread and carcass plies. The annular reinforcement consists of a single wide ply or piece of cord-reinforced rubber material which is folded so that there are three folded edges and four narrower, superimposed, interconnected plies or layers of reinforcement cords which, when the single ply is unfolded traverse the width of the single ply.

DESCRIPTION OF THE DRAWING

The following description of the invention will be better understood by having reference to the annexed drawing, wherein.

DETAILED DESCRIPTION OF THE DRAWING

Figure 1:
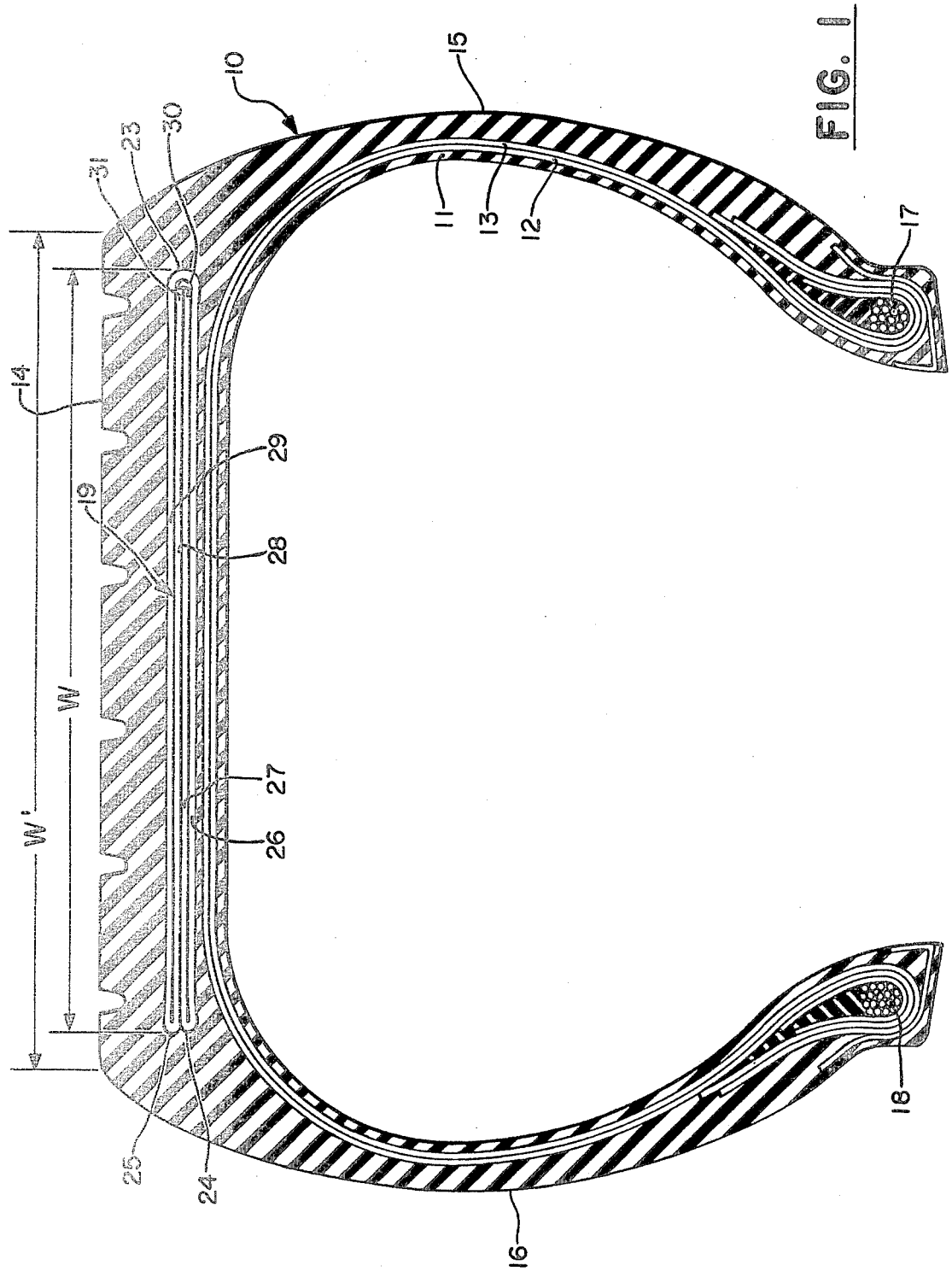
FIG. 1 is a section of a tire illustrating one embodiment of an annular reinforcement for the tire.
Figure 2:
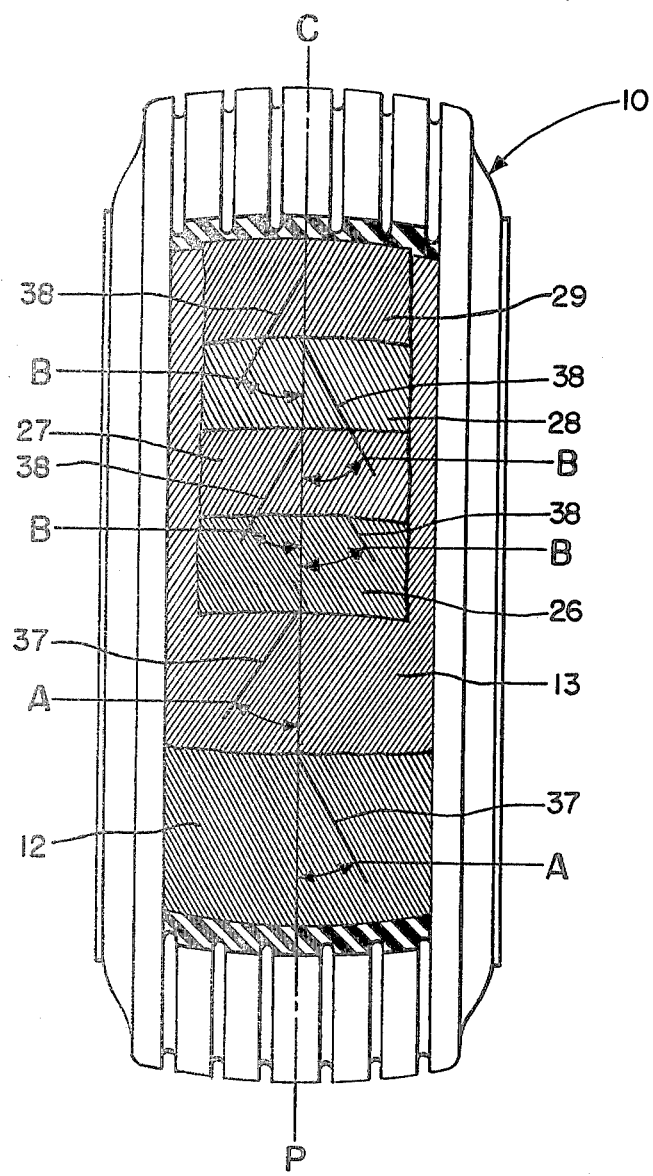
FIG. 2 is a top view of the tire with a portion thereof removed to show the cord angular relationships between the reinforcement cords of the carcass plies and annular reinforcement.

With reference to FIGS. 1 and 2, there is shown a pneumatic tire 10 which is preferably of the radial type, but can be of the bias-belted type. The tire 10 essentially comprises conventional components of a gas impervious innerliner 11; a plurality of carcass plies 12,13 covering the innerliner 11; a tread 14, and pair of sidewalls 15,16 surrounding the carcass plies 12,13 and terminating at a pair of annular, inextensible beads 17,18; and an annular reinforcement or breaker or belt structure 19, depending on the type of tire, which is disposed between the tread 14 and radially outermost carcass ply 15. The overall width W of the annular reinforcement 19 is not substantially greater than the correspondingly measured width W' of the tread 14 and preferably as wide, or slightly narrower than the width W' of the tread 14.

Figure 3:
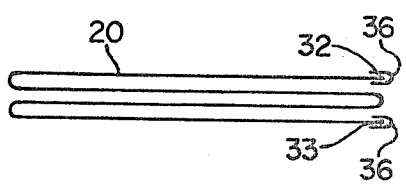
FIG. 3 is a section of another embodiment of the annular reinforcement.
Figure 4:
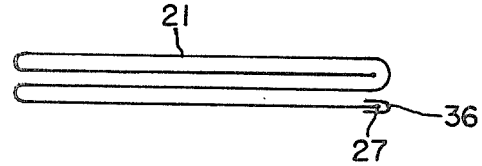
FIG. 4 is a section of still another embodiment of the annular reinforcement.
Figure 5:
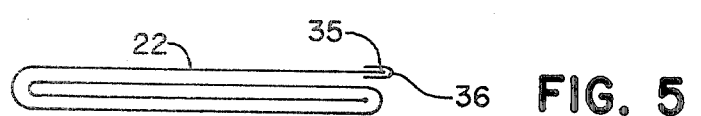
FIG. 5 is a section of still another embodiment of the annular reinforcement.

The annular reinforcement 19 of FIGS. 1 and 2, is similar to the annular reinforcements 20-22 of FIGS. 3-5 in that they are all formed of a single, wide ply or sheet of cord-reinforced rubber material which is folded a number of times so that the finally folded reinforcement has three folded edges 23-25 and consists of four, narrower, superimposed, interconnected plies or layers 26-29 of rubberized reinforcement cords, each of which cords traverses the width of the single ply when it is unfolded in a single sheet of material. The annular reinforcement 19 of FIGS. 1-2 differs from the other annular reinforcements 20-22 of FIGS. 3-5 in that the free ends 30,31 thereof, are not exposed, but covered over by, or terminated within the outer plies 26,29 and connecting folded edge 23. Thus, this particular structure has the advantage of having no cut edges exposed. The cut exposed edges 32-35 of the other annular reinforcements 20-22 of FIGS. 3-5 are covered, or embedded within narrow strips 36 of rubber material which is compatible with the surrounding rubber material of the tire.

As previously indicated, the tire 10 can be of the bias-belted or radial type. If the tire 10 is of the bias-belted type, then the reinforcement cords 37 (FIG. 2) of the carcass plies 12,13 are disposed at similar angles A in the broad range of from 20° to 55° relative to a plane CP containing the mid-circumferential centerline of the tread 14, such plane hereinafter and in the claims referred to as the centerplane, and narrower preferred range of from 20° to 40°. The reinforcement cords 38 of the breaker structure 19, utilized with such bias-type carcass plies 12,13, are disposed at similar angles B which are slightly lower, but essentially in the same range of angles as the cords 37 of the carcass plies 12,13. The cord angles are normally measured when the tire 10 is molded and vulcanized and uninflated. As best seen in FIG. 2, the cords of adjacent breaker plies 26-29 extend in different directions from the centerplane of the tire 10. Thus, it can be appreciated that starting from the radially innermost breaker ply 26 to the radially outermost breaker ply 29, the cords are in a left-right-left-right relationship relative to the centerplane. The reinforcement cords of the breaker structure 20 shown in FIG. 3 would likewise be oriented in a left-right-left-right relationship, whereas the reinforcement cords of the breaker structure 21 of FIG. 4 would be oriented in a left-right-right-left relationship and the reinforcement cords of the breaker structure 22 of FIG. 5 would be oriented in a left-left-right-right relationship. The left-right-right-left lay-up of the reinforcement is advantageous because of less thermal stress therein after vulcanization and low plysteer.

If the tire 10 is of the radial type, then the cords 37 of the carcass plies 12,13 would be radially oriented, i.e. disposed at similar angles A in the range of from 75 to 90 degrees relative to the centerplane. The reinforcement cords 38 of the belt structures 19-22 are disposed at smaller angles B in the broad range of from 0° to 30° relative to the centerplane and in the narrower preferred range of from 16° to 25°.

Thus, there has been described a unique, folded annular reinforcement having three folded edges and four superimposed interconnected plies, wherein the reinforcement cords are continuous throughout the overall width of the reinforcement when unfolded in a single ply or sheet. The reinforcement cords of the carcass plies 12,13 can be composed of any suitable material, e.g. rayon, nylon, polyester, aramid, or metal. Likewise, the reinforcement cords of the annular reinforcement can be composed of any appropriate material, e.g. rayon, nylon, polyester, aramid and metal, if the metal cords are sufficiently small in size or diameter so that a rubberized sheet of such metal cords can be folded.

What is claimed is:

1. A pneumatic tire comprising:
   (a) an innerliner;
   (b) a plurality of carcass plies reinforced with cords and covering the innerliner;
   (c) a tread and pair of sidewalls surrounding the carcass plies and terminating at a pair of annular, inextensible beads;

(d) an annular reinforcement disposed between the tread and radially outermost carcass ply, the reinforcement being a single ply of cord-reinforced rubber material which is folded so that the finally folded structure consists of three folded edges, two free ends and four superimposed interconnected plies, each of said plies having substantially the same width and being narrower than the single ply when unfolded, said free ends of the folded plies are covered over by a pair of connecting plies.

2. A pneumatic tire comprising:
(a) an innerliner;
(b) a plurality of carcass plies reinforced with cords and covering the innerliner;
(c) a tread and pair of sidewalls surrounding the carcass plies and terminating at a pair of annular, inextensible beads;
(d) an annular reinforcement disposed between the tread and radially outermost carcass ply, the reinforcement being a single ply of cord-reinforced rubber material which is folded so that the finally folded structure consists of three folded edges, two free ends and four superimposed interconnected plies, each of said plies having substantially the same width and being narrower than the single ply when unfolded, said cords are oriented relative to the centerplane of the tire in a left-right-right-left relationship from the radially innermost ply to the radially outermost ply of the reinforcement.

3. A pneumatic tire comprising:
(a) an innerliner;
(b) a plurality of carcass plies reinforced with cords and covering the innerliner;
(c) a tread and pair of sidewalls surrounding the carcass plies and terminating at a pair of annular, inextensible beads;
(d) an annular reinforcement disposed between the tread and radially outermost carcass ply, the reinforcement being a single ply of cord-reinforced rubber material which is folded so that the finally folded structure consists of three folded edges, two free ends and four superimposed interconnected plies, each of said plies having substantially the same width and being narrower than the single ply when unfolded, said cords are oriented relative to the centerplane of the tire in a left-left-right-right relationship from the radially innermost ply to the radially outermost ply of the reinforcement.

4. The tire of claim 1, wherein the cords are oriented relative to the centerplane of the tire in a left-right-left-right relationship from the radially innermost ply to the radially outermost ply of the reinforcement.

5. The tire of claim 2 or 3, wherein any exposed free edges of the folded plies are covered over and encapsulated in a thin, narrower sheet of rubber material, prior to the molding and vulcanization of the tire.

6. The tire of claim 1, 2 or 3, wherein the carcass plies are reinforced with cords which are disposed at angles in the range of from 75° to 90° relative to the centerplane.

7. The tire of claim 1, 2 or 3, wherein the cords of the folded plies of the annular reinforcement are disposed at angles in the range of from 16 to 24 degrees relative to the centerplane.

8. The tire of claim 1, 2 or 3, wherein the carcass plies are reinforced with cords disposed at angles in the range of from 20° to 55° relative to the centerplane.

9. The tire of claim 1, 2 or 3, wherein the cords of the folded plies of the annular reinforcement are disposed at angles which are slightly lower but essentially in the same range of angles as the cords of the carcass plies.

* * * * *